(12) United States Patent
Schmidt

(10) Patent No.: US 6,560,094 B2
(45) Date of Patent: May 6, 2003

(54) MOUNTING DEVICE FOR A MONITOR, A FLAT MONITOR WITH SUCH A MOUNTING DEVICE, AND AN ASSEMBLY OF A FLAT MONITOR, A DRAWER AND A COMPUTER

(75) Inventor: Robert Schmidt, Aachen (DE)

(73) Assignee: ACME Portable Machines GmbH, Aachen (DE)

( * ) Notice: Subject to any disclaimer, the term of this patent is extended or adjusted under 35 U.S.C. 154(b) by 0 days.

(21) Appl. No.: 10/100,886

(22) Filed: Mar. 19, 2002

(65) Prior Publication Data

US 2002/0135975 A1 Sep. 26, 2002

Related U.S. Application Data

(60) Provisional application No. 60/278,036, filed on Mar. 22, 2001.

(30) Foreign Application Priority Data

Mar. 21, 2001 (DE) .......................... 101 13 870

(51) Int. Cl.[7] .................................. G06F 1/16
(52) U.S. Cl. ................ 361/681; 361/679; 361/683; 248/917; 364/708.1
(58) Field of Search ................ 361/679, 681, 361/682, 683, 686, 727, 875; 248/917–923, 125.1, 223.1, 223.3, 223.6, 223.41, 225.1, 230, 283.1, 442.2, 458; 52/36.4; 364/708.1; 312/223.1, 209, 223.2, 107; 345/169, 905; 206/305, 320, 576

(56) References Cited

U.S. PATENT DOCUMENTS

| | | | | |
|---|---|---|---|---|
| 5,364,196 A | * | 11/1994 | Baitz et al. | 400/691 |
| 5,636,101 A | * | 6/1997 | Bonsall et al. | 361/681 |
| 6,246,573 B1 | * | 6/2001 | Khan et al. | 361/683 |
| 6,366,452 B1 | * | 4/2002 | Wang et al. | 361/681 |
| 6,418,010 B1 | * | 7/2002 | Sawyer | 361/681 |

FOREIGN PATENT DOCUMENTS

| | | | | |
|---|---|---|---|---|
| DE | 92 06 571 U1 | | 9/1992 | |
| DE | 296 15 366 U1 | | 12/1996 | |
| DE | 29616175 U1 | * | 12/1996 | G09F/9/33 |
| DE | 195 41 444 A1 | | 5/1997 | |
| DE | 297 14 035 U1 | | 11/1997 | |
| DE | 298 12 218 U1 | | 2/1999 | |
| DE | 299 08 904 U1 | | 9/1999 | |
| DE | 200 03 139 U1 | | 6/2000 | |
| JP | 409006250 A | * | 1/1997 | G09F/9/00 |

* cited by examiner

*Primary Examiner*—Darren Schuberg
*Assistant Examiner*—Michael Datskovsky
(74) *Attorney, Agent, or Firm*—Henry M. Feiereisen

(57) ABSTRACT

A mounting device is adapted to a flat monitor and has a box-like main body formed with a compartment with at least one computer connection point. In this way it is possible to locate a computer in immediate vicinity of the monitor. The compartment may be designed to resemble a drawer such that the computer can simply and easily be slid into the compartment.

12 Claims, 3 Drawing Sheets

MOUNTING DEVICE FOR A MONITOR, A FLAT MONITOR WITH SUCH A MOUNTING DEVICE, AND AN ASSEMBLY OF A FLAT MONITOR, A DRAWER AND A COMPUTER

CROSS-REFERENCES TO RELATED APPLICATIONS

This application claims the benefit of prior filed provisional application, Appl. No. 60/278,036, filed Mar. 22, 2001, pursuant to 35 U.S.C. 119(e), the subject matter of which is incorporated herein by reference.

This application claims the priority of German Patent Application Serial No. 101 13 870.9, filed Mar. 21, 2001, pursuant to 35 U.S.C. 119(a)–(d), the subject matter of which is incorporated herein by reference.

BACKGROUND OF THE INVENTION

The present invention relates to a mounting device for a monitor, a flat monitor with such a mounting device and an assembly of a flat monitor, a drawer and a computer.

These days, flat monitors are manufactured in various sizes such as with a diagonal screen size of 42". These monitors must be mounted securely on a wall, ceiling or perhaps on a table. Since a fall of these monitors could result in their destruction, a most diverse range of mounting devices is provided on the back of these monitors.

It would therefore be desirable and advantageous to provide an improved monitor to obviate prior art shortcomings.

SUMMARY OF THE INVENTION

According to one aspect of the present invention, a mounting device for a monitor, includes a box-like main body including a compartment with at least one computer connection point and a detachable connection to a rear side of the monitor.

The mounting device can be attached to and detached from the rear of the monitor. The invention is mindful of the fact that wall monitors for their operation normally require a computer and that this computer is usually placed near the wall monitor. This leads to the situation where, even if there is a good fixing arrangement for the monitor on the wall, a place has to be found for the computer where it can sit securely and it is out of the way. The box-like mounting device allows to provide a compartment within the mounting device with at least one computer connection socket. The computer can be placed into this compartment as if it were a drawer so that the computer is securely placed in the immediate vicinity of the monitor.

Within the context of this description, a computer is assumed to be a device which can take on the tasks of a computer. In a simple embodiment, this can be an electronic circuit board that can be plugged into the compartment. However, the plug-in computer can also be enclosed in a box, for example, and comprise further functional units such as switches, signal lights, sockets etc.

Thus, the mounting device allows a compact arrangement consisting of computer and monitor, which can be fixed to a wall, a ceiling or on a table.

It is advantageous if the mounting device outside of its compartment has a power connection point. This would make it possible to lead the power supply required for the computer and preferably also for the flat monitor via this connection point to the mounting device. Within the mounting device, the electrical current can then, for example, be distributed further via cabling.

A simple, practical embodiment provides for the mounting device to have a cable for connecting the computer connection point with the monitor. This makes it possible to have, on the mounting device, a simple plug-in connection for the monitor.

It is advantageous if the mounting device has a contact point for connecting the computer connection point with the monitor. This contact point can, for example, be in the form of a plug-socket arrangement or spring-loaded contact surfaces which, during the connection of the monitor with the mounting device, allow the relevant connection of the monitor to the computer connection point to take effect.

A practical embodiment provides that the mounting device has a power pack. This power pack can be used for supplying power to the computer as well as for supplying power to the monitor.

The mounting devices can be manufactured and distributed without including a computer. It is advantageous if the mounting device includes a computer that can be placed inside the compartment. This computer can then be adapted to the dimensions of the compartment or the compartment can be adapted to the dimensions of such a computer.

A simple sliding in and retracting of the computer can be achieved by attaching a handle to the slide-in computer.

According to another aspect of the present invention, a flat monitor is combined with such a mounting device.

For such flat monitors, it is advantageous if the circumferential line of the rear side of the flat monitor is approximately equivalent to the circumferential line of the mounting device. This ensures that the mounting device in the area of the attachment surface for the monitor is suitable in its dimensions for the monitor. Thus, a compact, aesthetically pleasing assembly of the flat monitor is achieved.

It is advantageous if the mounting device has the approximate depth of the flat monitor. Happily, it has been found that such a mounting device can be manufactured such that it is only insignificantly thicker than the monitor and can even be manufactured in a thickness less than a flat monitor.

A particularly suitable assembly of flat monitor and mounting device can be achieved when at least one lateral surface of the flat monitor is in line with one lateral surface of the mounting device. Preferably, all four edge surfaces of the mounting device are in line with the edge surfaces of the flat monitor so that the mounting device forms a matching unit with the flat monitor.

A safe arrangement of the computer in the mounting device is achieved by placing the compartment near the upper edge of the flat monitor. This allows the computer to slide into the mounting device in the direction of gravity. A computer held in such a manner need not, as is the case in other applications, be secured against sliding out of the mounting device.

According to still another aspect of the present invention, an arrangement includes a flat monitor, a drawer compartment and a computer where the flat monitor is connected in a detachable manner to the drawer compartment, the computer can slide into the drawer compartment, and the computer is connected to the drawer compartment via a plug-in data connection.

This allows the connection of various known types of flat monitor to a computer via a drawer compartment. The execution of the drawer compartment can be individually adapted to a special flat monitor or an adaptor can be provided between the drawer compartment and the flat monitor, which allows that the drawer compartment has a detachable connection to the flat monitor.

Since the computer, when sliding into the drawer compartment, is positively guided, it is possible to make that connection as a result of the computer sliding into the drawer compartment. For the drawer makes it possible to guide the computer accurately enough so that a plug attached to the computer can engage with a socket fixed to the drawer compartment or a socket attached to the computer is pushed into a plug fixed to the drawer compartment.

It is advantageous when the drawer compartment is placed on the rear side of the flat monitor. That makes the flat monitor slightly thicker. However, the drawer compartment can be used for fixing the flat monitor at a wall or ceiling once mounting attachments have been fixed to the drawer compartment.

The assembly in terms of the invention is particularly suited for large flat monitors. In that case in particular, the drawer compartment is smaller than the flat monitor.

If the drawer compartment is attached to the rear side of the flat monitor and is smaller than the flat monitor, it has the advantage that, when viewing the screen of the flat monitor, the drawer compartment is not visible.

Various devices have been developed for monitors to be mounted on a ceiling, a wall or a stand. These devices have to be adapted individually to the various types of flat monitor and are expensive to make. Therefore, it is proposed to equip the drawer compartment with an apparatus for attaching the assembly to a ceiling, a wall or a stand. The drawer compartment is preferably designed such that it can be fitted, in a detachable manner, to various monitors either directly or via an adaptor. Thus, an apparatus, fixed to the drawer compartment, for attaching the assembly to a ceiling, a wall or a stand has the advantage that the drawer compartment can remain attached to the ceiling, the wall or the stand while either the monitor can be removed from the drawer compartment or the computer can be pulled out of the drawer compartment. Thus, especially the components prone to break-downs, such as monitor and computer, can simply and easily be pulled out of the drawer compartment or detached from the drawer compartment and be replaced by an exchange unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
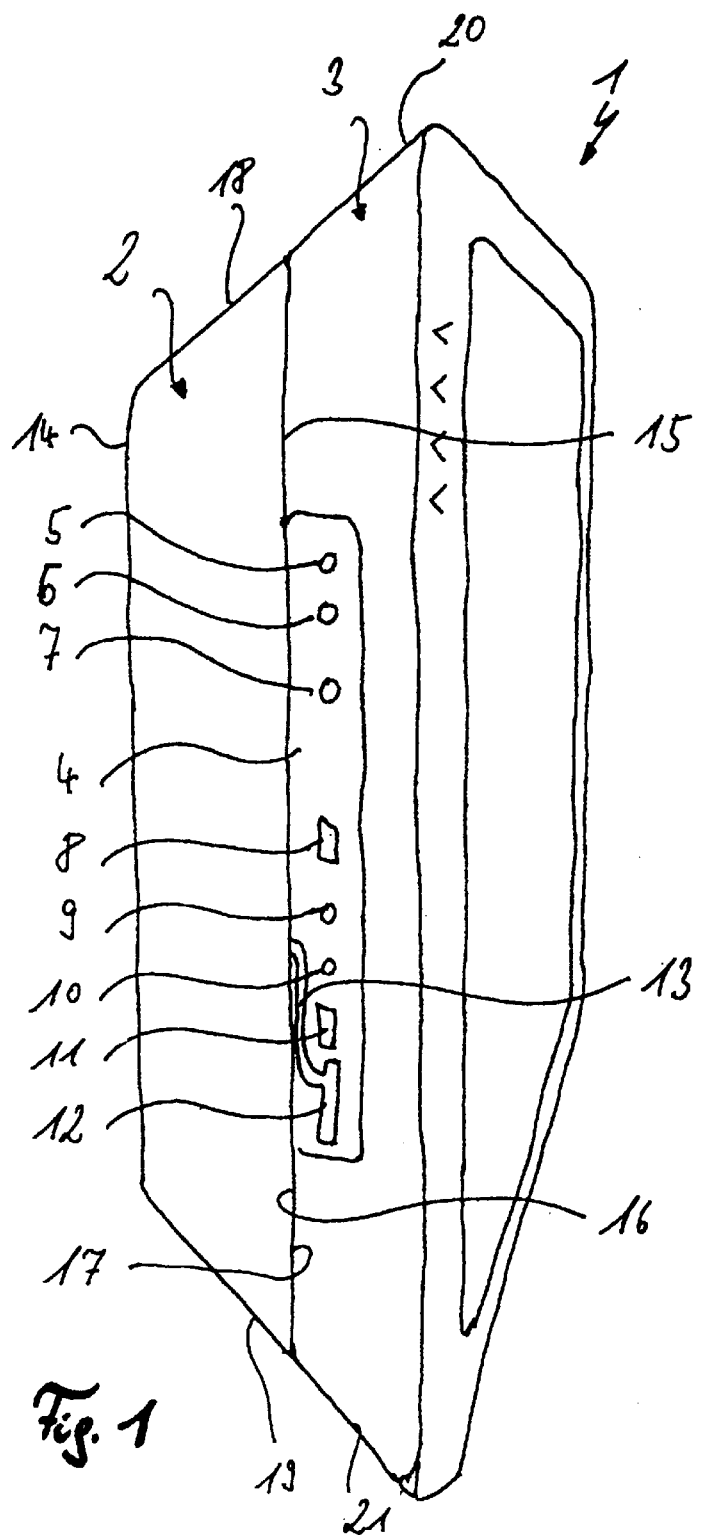
FIG. 1 is a schematic, perspective view of the underside of a plasma monitor with mounting device.

Turning now to the drawing, and in particular to FIG. 1, there is shown an arrangement which essentially includes a mounting device 2 and a flat monitor 3. The flat monitor 3 may be a commercially available plasma monitor with a 42" screen and has a compartment 4 which has arranged at its underside connections and adjustment devices 5 to 12. The connection point 12 has a cable 13 attached to connect the monitor 3 with a computer (not shown) located in the mounting device 2.

The mounting device 2 has a main body with a side 14 which, for a wall-mounted monitor, attaches to the wall, and a side 15 which provides the attachment surface for the monitor 3. The flat monitor 3 has a casing with a rear wall which defines a circumferential line 16 to correspond in its shape and position to a circumferential line 17 of the monitor-facing side 15 of the mounting device 2. The depth of the mounting device 2 between the side 14 adjacent to a wall and the side 15 adjacent to the monitor 3 corresponds approximately to the depth of the flat monitor 3 between its side adjacent to the mounting device 2 and the visual display surface of the monitor 3.

The monitor 3 as well as the mounting device 2 have a frustoconical shape whereby the mounting device 2 has side surfaces 18, 19 which are in line with side surfaces 20, 21 of the flat monitor 3.

Figure 2:
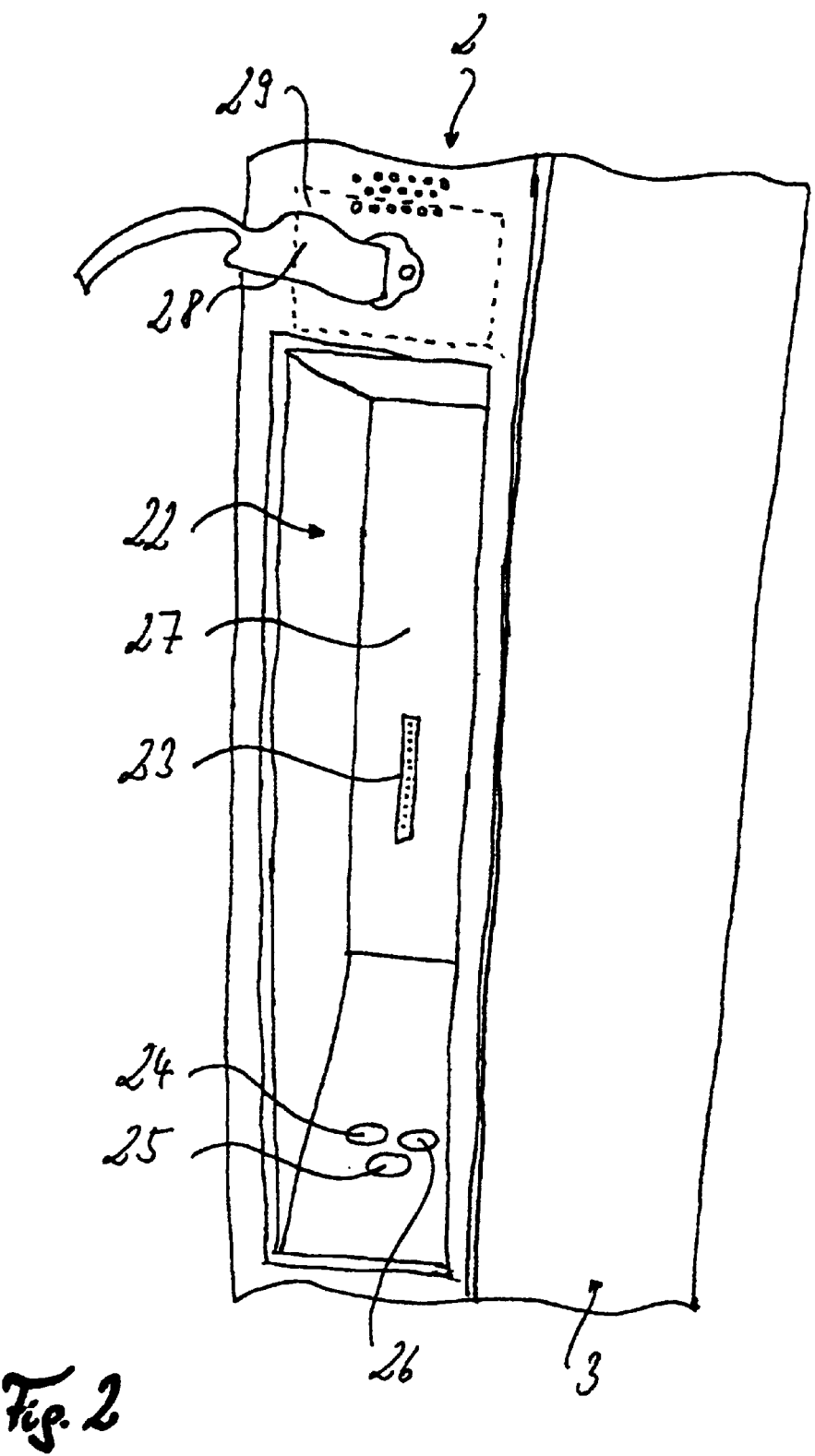
FIG. 2 is an enlarged perspective view of a compartment area at the upper edge of the mounting device.

The opposite side of the mounting device 2 shown in FIG. 2 depicts a compartment 22 with a computer connection point 23. Furthermore, cable entries 24, 25 and 26 are located in the compartment 22. The compartment 22 is designed such that a computer can be slid into this compartment. The computer couples thereby with connection point 23 on the base plate 27 of the compartment 22. The connection point 23 is connected with a cable 13 which is located on the side of the base plate 27 of compartment 22 being opposite to compartment 22, whereby the cable 13 connects the computer (not shown) with the flat monitor 3. A plug 28 is part of a power supply line for connection to a power supply 29 of the box-like mounting device 2. The power supply 29 is indicated here by a phantom line.

Figure 3:
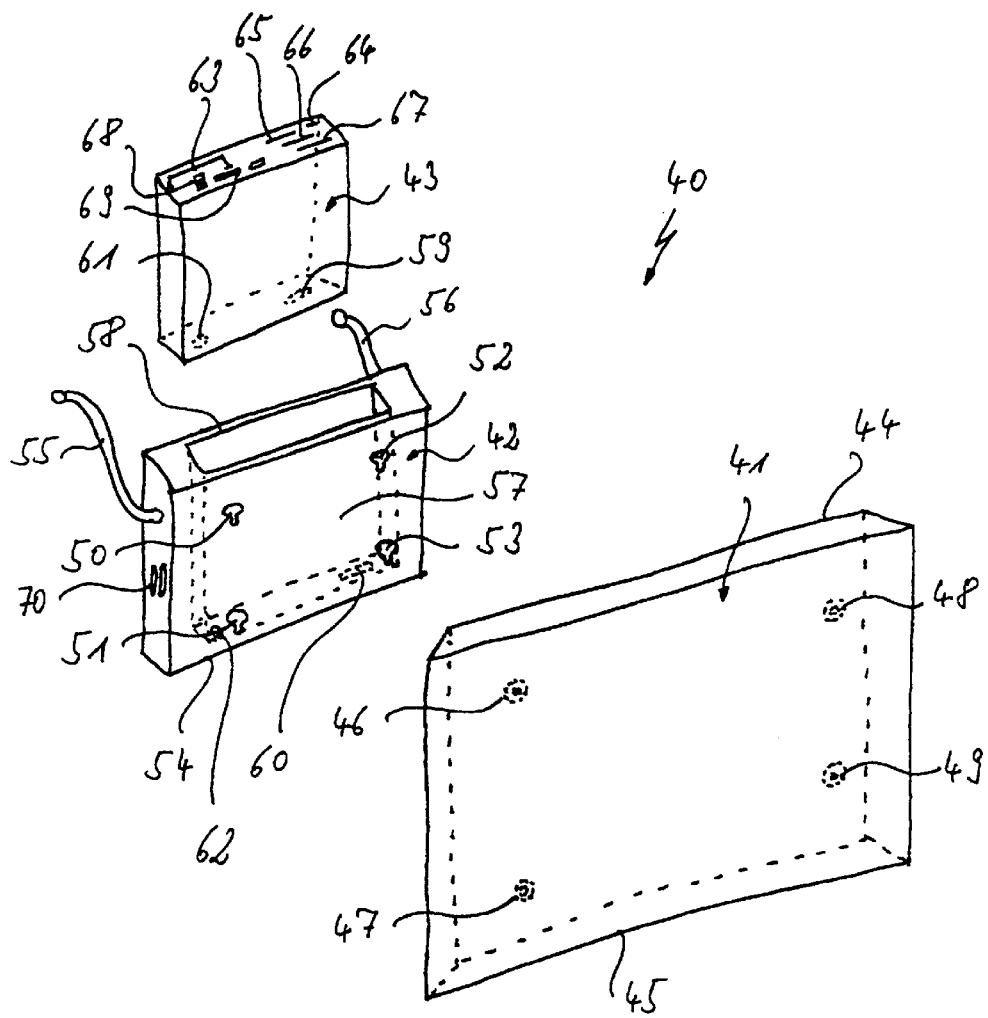
FIG. 3 is a perspective view of the flat monitor, drawer compartment and computer.

Turning now to FIG. 3, there is shown an exploded, perspective view of an assembly, generally designated by reference numeral 40 and including a flat monitor 41, a drawer compartment 42 and a computer 43. The flat monitor 41 may be a commercially available LCD monitor with a particularly large screen and a housing tapering inward behind the screen. The rear side 44 of the monitor 41 thus has a smaller area than the front side 45 of the monitor.

At the rear side 44 of monitor 41, four fixing elements 46, 47, 48 and 49 in the shape of nailheads are provided. These fixing elements 46 to 49 enable the monitor 41 to be fixed to pear-shaped recesses 50, 51, 52 and 53 at the front side 54 of the drawer compartment 42. To that end, the nailhead-shaped fixing elements 46 to 49 can be inserted into the larger end of the pear-shaped recesses 50 to 53. The monitor 41 then slides down to a level where the nailhead-shaped holding elements are retained within the narrow area of the pear-shaped recesses 50 to 53.

The drawer compartment 42 has two mounting attachments 55 and 56 with which it can be attached to a wall, a ceiling or a stand (not shown). Apart from that, the drawer compartment 42 has a box-like recess 57 (drawn in dashed lines) with an opening 58 which allows the computer 43 to be slid into the drawer compartment 42 like a drawer.

When the computer 43 is slid into the drawer compartment 42, socket 59 (drawn in dashed lines) engages with plug 60 such that, with the computer 43 pushed home properly, an electrical contact is closed between plug 60 and socket 59. Naturally, a socket can be provided at the drawer compartment 42 and a plug at the computer 43. The same applies to socket 61 (also drawn in dashed lines) which engages with plug 62. A handle 63 makes it easier to properly slide the computer 43 into drawer compartment 42.

In the embodiment shown in FIG. 3, the plug 62 connects to the power supply and plug 60 to the data input. On the top side of the computer 43, an On/Off switch 64 is provided. Next to it, there are two PCI slots 65, 66 and a slot for a CD/DVD drive 67. Furthermore, on this top side of computer 43, there are network interfaces 68 and interfaces for peripheral units such as a mouse or a printer.

In order to avoid overheating of computer 43, ventilation slots 70 are provided in the drawer compartment 42, which allow air movement to the built-in fan in the computer.

The arrangement shown in FIG. 1 essentially comprises the mounting device 2 and the flat monitor 3. The flat monitor is a commercially available plasma monitor with a 42" screen. This monitor has a compartment 4 at its underside in which the connections and adjustment devices 5 to 12 are placed. The connection point 12 has a cable 13 attached that connects the monitor 3 with a computer (not shown) located in the mounting device 2.

The mounting device 2 has a side 14 which, for a wall-mounted monitor, attaches to the wall, and a side 15 which provides the attaching surface for the monitor 3. The circumferential line 16 at the rear of flat monitor 3 corresponds in its shape and position to the circumferential line 17 of the side 15 of mounting device 2, which attaches to monitor 3. The depth of the mounting device between the side 14 adjacent to the wall and the side 15 adjacent to monitor 3 corresponds approximately to the depth of the flat monitor between its side adjacent to the mounting device and the screen surface.

The shape of monitor 3 is that of a truncated pyramid and the shape of mounting device 2 is also that of a truncated pyramid whereby the side surfaces 18, 19 of the mounting device are in line with the side surfaces 20, 21 of flat monitor 3.

The opposite side of the mounting device 2 shown in FIG. 2 shows the compartment 22 with the computer connection point 23. Furthermore, cable entries 24, 25 and 26 are located in compartment 22.

The compartment 22 is designed such that a computer can be slid into this compartment. Then, the computer couples with connection point 23 on the base plate 27 of compartment 22. The connection point 23 is connected with a cable 13 which is located on the side of base plate 27 of compartment 22 being opposite compartment 22, said cable 13 connecting the computer (not shown) with the flat monitor 3. A plug 28 is part of the power supply line into the box-like mounting device 2 in which space is provided for a power supply 29 shown in a phantom line.

The assembly 40 shown in FIG. 3 consists of the flat monitor 41, the drawer compartment 42 and the computer 43. The flat monitor 41 is a commercially available LCD monitor with a particularly large screen and a housing tapering inward behind the screen. The rear side 44 of the monitor 41 thus has a smaller area than the front side 45 of the monitor.

At the rear side 44 of monitor 41, four fixing elements 46, 47, 48 and 49 in the shape of nailheads are provided. These fixing elements 46 to 49 enable the monitor 41 to be fixed to pear-shaped recesses 50, 51, 52 and 53 at the front side 54 of the drawer compartment 42. To that end, the nailhead-shaped fixing elements 46 to 49 can be inserted into the larger end of the pear-shaped recesses 50 to 53. The monitor 41 then slides down to a level where the nailhead-shaped holding elements are retained within the narrow area of the pear-shaped recesses 50 to 53.

The drawer compartment 42 has two mounting attachments 55 and 56 with which it can be attached to a wall, a ceiling or a stand (not shown). Apart from that, the drawer compartment 42 has a box-like recess 57 (drawn in dashed lines) with an opening 58 which allows the computer 43 to be slid into the drawer compartment 42 like a drawer.

When the computer 43 is slid into the drawer compartment 42, socket 59 (drawn in dashed lines) engages with plug 60 such that, with the computer 43 pushed home properly, an electrical contact is closed between plug 60 and socket 59. Naturally, a socket can be provided at the drawer compartment 42 and a plug at the computer 43. The same applies to socket 61 (also drawn in dashed lines) which engages with plug 62. A handle 63 makes it easier to properly slide the computer 43 into drawer compartment 42.

In the embodiment shown in FIG. 3, the plug 62 connects to the power supply and plug 60 to the data input. On the top side of the computer 43, an On/Off switch 64 is provided. Next to it, there are two PCI slots 65, 66 and a slot for a CD/DVD drive 67. Furthermore, on this top side of computer 43, there are network interfaces 68 and interfaces for peripheral units such as a mouse or a printer.

In order to avoid overheating of computer 43, ventilation slots 70 are provided in the drawer compartment 42, which allow air movement to the built-in fan in the computer.

While the invention has been illustrated and described as embodied in a mounting device for a monitor, a flat monitor with such a mounting device, and an assembly of a flat monitor, a drawer and a computer, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A mounting device for a monitor, comprising a box-like main body including a compartment with at least one computer connection point and a detachable connection to a rear side of the monitor, wherein the compartment is constructed for receiving a computer by sliding the computer into the compartment.

2. The mounting device of claim 1, wherein the main body has a power connection point outside the compartment.

3. The mounting device of claim 1, and further comprising a cable for connecting the computer connection point with the monitor.

4. The mounting device of claim 1, wherein the main body has a contact point for connecting the computer connection point with the monitor.

5. The mounting device of claim 1, and further comprising a power pack fitted to the main body.

6. The mounting device of claim 1, wherein the computer has a handle.

7. An assembly, comprising:
   a flat monitor;
   a drawer compartment; and
   a computer configured for sliding insertion into the drawer compartment and connection to the drawer compartment via a plug-in data connection,
   wherein the drawer compartment is operatively attached to a rear side of the flat monitor.

8. The assembly of claim 7, wherein the data connection is realized by sliding the computer into the drawer compartment.

9. The assembly of claim 7, wherein the drawer compartment is smaller in size than the flat monitor.

10. An assembly, comprising:

a flat monitor;

a drawer compartment; and a computer configured for sliding insertion into the drawer compartment and connection to the drawer compartment via a plug-in data connection, wherein the flat monitor is detachably fixed to the drawer compartment, wherein the drawer compartment has means for securing the assembly to a ceiling, a wall or a stand.

11. The assembly of claim 10, wherein the data connection is realized by sliding the computer into the drawer compartment.

12. The assembly of claim 10, wherein the drawer compartment is smaller in size than the flat monitor.

* * * * *